(12) United States Patent
Erdle et al.

(10) Patent No.: US 6,833,206 B2
(45) Date of Patent: Dec. 21, 2004

(54) AUXILIARY POWER SUPPLY FOR A VEHICLE WITH A COMBUSTION ENGINE AND METHOD FOR OPERATING SAME

(75) Inventors: Erich K. Erdle, Immenstaad (DE); Volker Richters, Leinfelden-Echterdingen (DE); Ottmar Schmid, Markdorf (DE)

(73) Assignee: DaimlerChrysler AG, Stuttgart (DE)

( * ) Notice: Subject to any disclaimer, the term of this patent is extended or adjusted under 35 U.S.C. 154(b) by 145 days.

(21) Appl. No.: 09/964,840

(22) Filed: Sep. 28, 2001

(65) Prior Publication Data

US 2003/0064260 A1 Apr. 3, 2003

(51) Int. Cl.⁷ .............................. H01M 8/18; H01M 8/04
(52) U.S. Cl. .............................. 429/17; 429/21; 429/25
(58) Field of Search .............................. 429/13, 17, 21, 429/25

(56) References Cited

U.S. PATENT DOCUMENTS

| | | | |
|---|---|---|---|
| 4,128,701 A | * 12/1978 | Maricle | ........................ 429/21 |
| 4,657,829 A | 4/1987 | McElroy et al. | ............... 429/19 |
| 4,797,186 A | * 1/1989 | Levy et al. | ................ 429/21 X |
| 5,306,577 A | * 4/1994 | Sprouse | ..................... 429/21 X |
| 5,360,679 A | * 11/1994 | Buswell et al. | ............... 429/19 |
| 5,527,632 A | * 6/1996 | Gardner | ..................... 429/21 X |
| 5,900,330 A | * 5/1999 | Kagitani | ....................... 429/17 |
| 6,068,942 A | * 5/2000 | Strasser et al. | ............... 429/13 |

FOREIGN PATENT DOCUMENTS

| JP | 6-163064 | * 6/1994 | ............ H01M/8/06 |
|---|---|---|---|
| JP | 9-139217 | * 5/1997 | ............ H01M/8/06 |

* cited by examiner

Primary Examiner—Stephen J. Kalafut
(74) Attorney, Agent, or Firm—Crowell & Moring LLP

(57) ABSTRACT

A power supply for an auxiliary power unit APU of a combustion vehicle having a combustion engine includes a fuel cell with a hydrogen input, an oxygen input and an exhaust output, an electrolyzer capable of generating hydrogen and oxygen from water, a hydrogen storage for storing hydrogen produced by the electrolyzer, a water supply (for supplying water to the electrolyzer), and a pressure pump for adjusting the pressure between the water supply and the electrolyzer.

15 Claims, 1 Drawing Sheet

AUXILIARY POWER SUPPLY FOR A VEHICLE WITH A COMBUSTION ENGINE AND METHOD FOR OPERATING SAME

BACKGROUND AND SUMMARY OF THE INVENTION

The invention relates to an auxiliary power supply for a vehicle with a combustion engine, and to a method for operating the same.

Many vehicles, including for example trucks, buses and premium segment cars, have a need for electric power during periods when the vehicle's combustion engine is turned off and at a standstill, for supplying auxiliary drives or other electronic equipment, such as air-conditioning, cooking, and telecommunication. These functions are currently unavailable in vehicles, e.g., while parked. When the engine is off, some vehicles run a generator driven by a small internal combustion engine; others idle their combustion engines causing substantial fuel consumption due to part load conditions for the diesel engine and significant emissions of pollutants and noise.

Fuel cell vehicles, on the other hand, have the ability to produce electric power during stand-still of the vehicle, without causing considerable pollution or noise compared to vehicles with a combustion engine. U.S. Pat. No. 4,657,829 A1 discloses a fuel cell car with a fuel cell vehicular power plant. Fuel for the fuel cell stack is supplied by a hydrocarbon catalytic cracking reactor and CO shift reactor. A water electrolysis subsystem is associated with the stack. During low power operation, part of the fuel cell power is used to electrolyze water with hydrogen and oxygen electrolysis products being stored in pressure vessels. During peak power intervals (viz, during acceleration or start-up), pure oxygen and pure hydrogen from the pressure vessels are supplied as the reaction gases to the cathodes and anodes of the fuel cell stack in place of air and hydrocarbon reformate. However, for a standard vehicle with a combustion engine there is no energy production solution with a fuel cell power unit.

One object of the invention is to provide an electric power supply for a vehicle with a combustion engine, which can supply power even at stand-still of the combustion engine.

Another object of the invention is to provide a vehicle power supply that reduces pollution and noise.

Still another object of the invention is to provide a method for operating such a power supply.

These and other objects and advantages are achieved by the power supply method and apparatus according to the invention in which the fuel cell system operates at least indirectly on vehicle based fuels. That is, vehicle produced electric power is used to electrolyze water while the vehicle 1 is operative, and this hydrogen is then used when the vehicle 1 is inoperative to generate electric power via a fuel cell.

According to the invention there is no need to run a combustion engine for producing electric power while the vehicle engine is off; and it is unnecessary to tank an additional fuel and store it on board of the vehicle to operate the fuel cell.

Other objects, advantages and novel features of the present invention will become apparent from the following detailed description of the invention when considered in conjunction with the accompanying drawings.

DETAILED DESCRIPTION OF THE DRAWINGS

The invention can be used advantageously in motor vehicles where a fuel cell system supplies electric energy for low power requirements. Also, the invention can be used to great advantage in trucks or buses, premium segment cars or other vehicles which need considerable amounts of electric power even when their combustion engine is not running. Preferably the invention is used in combination with an internal combustion engine as combustion engine of the vehicle.

Figure 1:
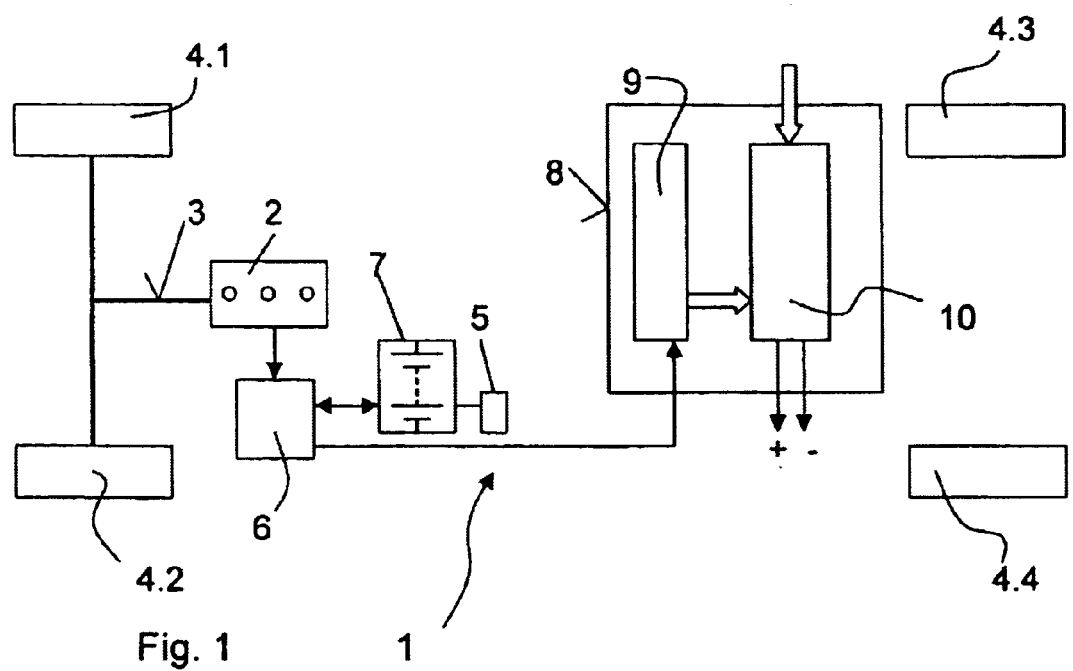
FIG. 1 is a schematic depiction of a first preferred embodiment of a vehicle with a combustion engine and a fuel cell system according to the invention.

FIG. 1 shows schematically a vehicle 1 with a combustion engine 2. The vehicle 1 has wheels 4.1–4.4 with at least two driveable wheels 4.1, 4.2 connected to a drive shaft 3 as is known in the art. The vehicle 1 may also be equipped with more than one driveable axle. The power train of the vehicle is shown only schematically.

The vehicle 1 is also equipped with a conventional alternator 6, an electric storage device 7 (e.g., a battery), and various low power electric loads 5. Alternator 6 can also be a starter/generator device which, when used as a motor, can start the engine and which, when used as a generator, is mechanically driven by the engine thus producing electric energy which can be stored in an electric storage means such as a battery or the like.

Alternator 6 produces electric power while the combustion engine 2 is operative. The electric storage device 7 is used for starting the engine and/or can be used to store electric power produced by the alternator 6, as is known in the art.

The various electric loads 5 are preferably low power electric equipment usually present onboard a vehicle, such as lighting, electric auxiliary drives, water pumps, air conditioning, radio, coffee maker, microwave oven, refrigerator, telecommunication devices and so on.

According to the invention the vehicle is also equipped with an auxiliary power unit (APU) 8 which delivers electric power when the combustion engine is not running. As main components the APU 8 comprises a fuel cell 10 and an electrolyzer 9 for delivering hydrogen and/or oxygen to the fuel cell 10. Advantageously, the electrolyzer 9 comprises a hydrogen storage tank, and can also comprise an oxygen storage tank.

Figure 2:
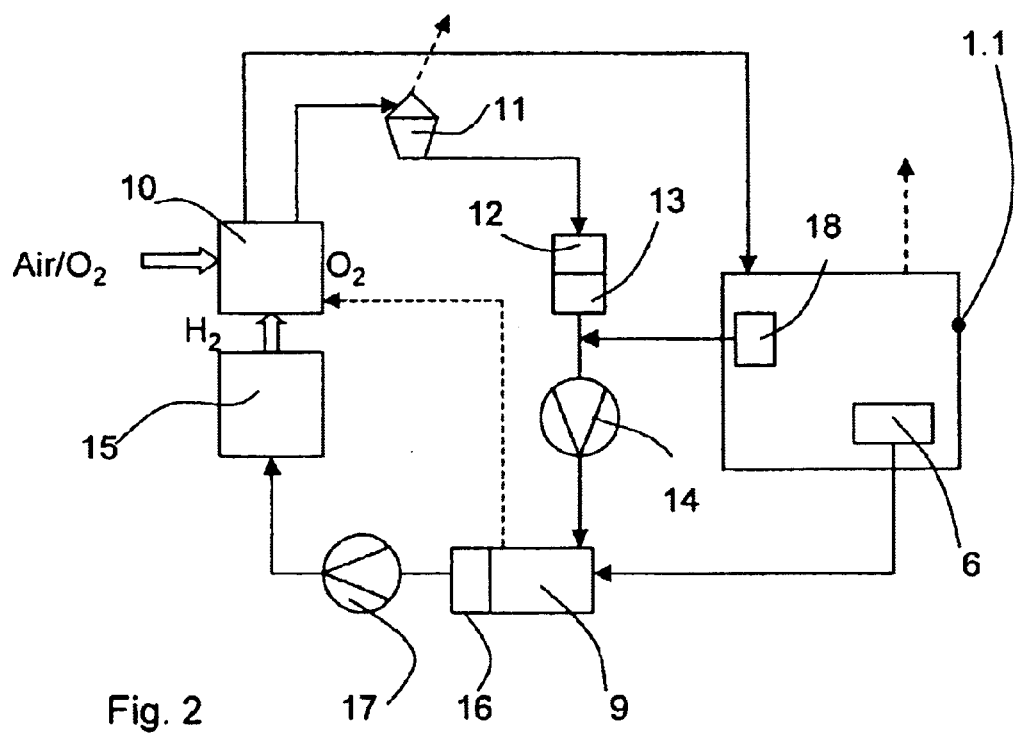
FIG. 2 shows a detail of the power supply unit in a vehicle.

The APU 8 is described in more detail in FIG. 2, in which reference number 1.1 designates the regular part of the vehicle 1 without the APU 8 (i.e., with the combustion engine 2 and alternator 6, electric storage device 7, power train and so on).

In addition to the electrolyzer 9 and the fuel cell 10, the APU 8 includes a hydrogen storage unit 15, a device 11 for recovering water from the fuel cell exhaust, a water tank 12 for storing water. Also, dc/dc-converters and/or dc/ac-converters, and electric control means are included for distributing the electric power of the fuel cell 10 to electric loads 5. Additionally, an oxygen storage means can be included in order to store the oxygen produced by the electrolyzer 9.

The fuel cell 10 is composed of one or more stacks of single fuel cells, as known in the art, and is thus capable of delivering enough electric power as needed in the APU 8. The electric power of the auxiliary power unit 8 is well below the electric power needed for a traction system in a vehicle 1.

In a further preferred embodiment (not shown), the fuel cell 10 is a reversible fuel cell which is capable of fuel cell and electrolyzer operation. The reversible fuel cell 10 itself can oxidize hydrogen to water when operating as a fuel cell, and decompose water to hydrogen and oxygen when operating as an electrolyzer. In this embodiment, therefore, the fuel cell 10 and the electrolyzer 9 are replaced by a single reversible fuel cell unit.

According to the invention electric power from the vehicle based alternator 6 is used to produce hydrogen as fuel for the fuel cell system 10 while the combustion engine 2 is operative. The electric power of the alternator 6 powers the electrolyzer 9, which is preferably a high pressure electrolyzer with a working pressure above 100 bar (e.g., 140 bar). The hydrogen is favorably stored in the hydrogen tank 15, which is preferably a high pressure tank being capable of storing hydrogen at a pressure above 300 bar, e.g. 400 bar. If enough space is available, for example in a truck, a bigger hydrogen storage may be acceptable, storing hydrogen just at the electrolyzer's operating pressure (the electrolyzer pressure is sufficient for pressurizing the hydrogen). When the engine 2 is inoperative and electric power is needed, the hydrogen is consumed in the fuel cell 10 and electric power is delivered by the fuel cell 10 to the vehicle 1.

Hydrogen is produced by the electrolyzer 9 which is powered by the alternator 6, by decomposing water. The water is fed from water supply means, e.g. a water supply tank 18, and/or from a water buffer tank 13 which is fed from the water carried in the fuel cell exhaust. The electrolyzer 9 can be operated directly with the dc-voltage available at the vehicle's generator/battery terminals, or while the vehicle is cruising. The electrolyzer 9 favorably is operated at elevated pressure, with the hydrogen generated being stored in a pressure tank 15 which can also be used as the electrolyzer's housing. During periods when the vehicle is idle, with the combustion engine 2 turned off, the fuel cell 10 is operated with the hydrogen from the storage tank 15 and ambient air providing auxiliary power silently and cleanly for example, air conditioning purposes. Additionally oxygen from the electrolyzer 9 can be stored on board and fed in the air stream to the fuel cell 10 (indicated by the dotted arrow) to improve the performance of the system such as power density, efficiency and the like.

The fuel cell 10 is cooled either by air, or by using part of the regular coolant loop of the vehicle 1.

The water for the electrolyzer 9 can be from the fuel cell's exhaust, which however might not cover the entire water demand, and/or by a condenser in the vehicle engine's exhaust while the vehicle 1 is cruising, purified appropriately and stored in a small water tank 18. Only a relatively small percentage of the steam contained in the engine's exhaust needs to be condensed to cover the water demand of the electrolyzer 9.

The fuel cell exhaust is fed into a condenser 11, where water carried therein is separated. The gaseous exhaust is then discharged to the ambient atmosphere. Water collected in the manner is fed into the water buffer tank 13 via a purification unit 12 arranged upstream the water buffer tank 13 in order to avoid pollution of the water fed into the electrolyzer 9.

Water from the water tank 18 can be added upstream or downstream of the water buffer tank 13 or into the water buffer tank 13 in addition to the amount of water recycled from the fuel cell exhaust. Advantageously a pressure pump 14 is arranged between the water buffer tank 13 and the electrolyzer 9 in order to pressurize the electrolyzer 9 via pressurizing of liquid water and thus generate hydrogen at the elevated pressure of the electrolyzer without any need to compress this gas. It is energetically favorable to arrange the pump 14 so that the liquid can be used as pressure mediating medium. Downstream from the electrolyzer 9, a gas-liquid separator 16 is arranged for keeping the water in the electrolyzer 9 and avoiding water droplets' being fed into the hydrogen storage 15.

Optionally, a compressor 17 can be arranged between the electrolyzer 9 and the hydrogen storage 15 to adjust the pressure levels of the media kept in the electrolyzer 9 and the hydrogen storage 15. Additionally, the storage 15 can be reduced in volume by compressing the hydrogen.

Oxygen necessary for the operation of the fuel cell 10 can be produced by the electrolyzer 9 via an optional oxygen storage (not shown) and/or by feeding air into the fuel cell. Especially polymer electrolyte membrane fuel cells can be run on air as oxidant. Preferably the air or the oxygen is fed via a compressor or blower at the pressure level required for the fuel cell operation. If the fuel cell 10 is run under more or less ambient pressure conditions, the compressor can be replaced by a blower. Further, if the oxidant for the fuel cell is air, additional oxygen produced by the electrolyzer 9 can be fed to the fuel cell cathode to boost the fuel cell 10. This is indicated by the dotted line between electrolyzer 9 and the fuel cell 10 in the figure.

Although the combination of electric power consuming electrolysis with producing electric power by the fuel cell is not a very efficient method of generating electric power, the overall efficiency of the vehicle 1 for low power requirements is enhanced by this combination according to the invention. Environmental pollution is reduced. As the low power requirements are fulfilled by the fuel cell system when the engine is not running, for example when the vehicle (e.g., a truck) stops overnight, vehicular noise is reduced substantially and comfort for passengers is increased. This cannot be achieved with batteries as storage means for electric power, because they are too heavy and their cyclability is not sufficient.

According to the invention, vehicle produced electric power is used to electrolyze water while the vehicle 1 is operative, and this hydrogen is then used when the vehicle 1 is inoperative to generate electric power via a fuel cell.

Using an electrolyzer 9 in the ways described above eliminates the need for an expensive and complex fuel processing system, and allows the fuel cell system 10 to operate at least indirectly on the same fuel as the vehicle's internal combustion engine 2.

In a preferred embodiment an APU 8 is used in a truck. It is assumed that a continuous net power of about 2 kW is sufficient to cover the power demand of the truck's cabin during parking hours. If the peak power demand is larger for a short time, the truck's battery 7 can be used to boost the fuel cell 10 running at peak power in addition. A preferred fuel cell 10 delivers a current density of about 1 A/cm$^2$ at a voltage of 0.65 V corresponding to a power density of 0.65 W/cm$^2$. Thus a total of about 3100 cm$^2$ of active cell area is needed. On board power supplies of trucks, as used for example in the United States, operate at a voltage level of 12 V; and thus about 19 single cells should be stacked together to form the fuel cell 10, yielding about 12 V output voltage with 19×0.65 V. Assuming an active area of 163 cm$^2$ per cell, and assuming that the active area of a cell covers about 70% of the total area, the cell is about 230 cm$^2$ in size or about 15×15 cm$^2$. This results in a total volume of a stack of about $15\times15\times0.5\times19$ cm$^3$ = 2137 cm$^3$ or slightly more than 2 liters. The factor 0.5 reflects the efficiency of a state of the art fuel cell of 50%. Its weight can be estimated to be a little more than 2 kg. The numbers for differing power demands can be derived easily in a similar way.

For the electrolyzer 9 a maximum of 10 hours of the 2 kW power demand mentioned above is assumed. Further assuming an efficiency of the fuel cell 10 of about 50% according to the state of the art, the hydrogen demand is about 13 Nm$^3$. Assuming 10 hours of operation for the electrolyzer 9 as well its capacity results to be 1.3 Nm$^3$/h. With advanced state of the art high pressure electrolyzer technology operating well above 100 bar, (preferably around 140 bar), and a current density of 1.6 A/cm$^2$ at a voltage of about 12 V; six cells with an active area of 335 cM$^2$ are needed. The weight and volume of this 12 V electrolyzer stack unit are estimated to be in the same order of magnitude of slightly higher, respectively, as for the fuel cell 10.

It is to be understood that the system according to the invention, however, can easily be adjusted for other voltage levels, such as 42 Volt circuits and the like.

The hydrogen storage tank 15 must be capable of storing about 13 Nm$^3$ hydrogen for a power demand of 2 kW. For compressed hydrogen at about 140 bar as operating pressure of the electrolyzer 9, this results in a volume demand of about 100 liters, which in turn corresponds to a cylinder of 80 cm height and about 40 cm in diameter. This size is comparable to the size of the regular pressurized air tanks for the truck's brakes. Applying a higher operating pressure results in a corresponding reduction of volume.

As for the balance of plant equipment several components have to be considered to achieve a functional system. These are, for example, a pressure control system to feed the ambient pressure fuel cell 10 from the high pressure hydrogen tank 15, gas/liquid separators 16 as part of the electrolyzer 9, a water pump 14 yielding high pressure to feed the electrolyzer 9, dc/dc-converters and/or ac/dc-converters, controllers, sensors and so on.

A preferred system such as the one described above features about 25 l/kW if compressed hydrogen at 140 bar is used to store the hydrogen. This value can be reduced to 10 l/kW if the operating pressure is increased to about 400 bar. Other methods for storing hydrogen can be used alternatively.

Additionally, fuel cell 10 and electrolyzer 9 can be operated at higher or lower voltages resulting in significantly better overall system efficiency without sacrificing the volume which is mainly determined by the hydrogen storage.

Electrolyzer hardware is well developed, reliable and cheap. With rather small volumes of water significant amounts of hydrogen can be produced. For example, 1 liter of water yields about 1200 Nl of hydrogen equivalent to 3.6 kWh of energy content (lower heating value).

It is preferred that a fuel cell 10 used in the power supply according to the invention is composed of fuel cell stacks without external humidification needs. The power supply needs no external fuelling, i.e. is independent of whatever fuel the vehicle 1 is running on and is of compact and simple system design. No fuel processor is needed. The system shows high dynamics features with an extremely short start-up time since no bulky system components have to be heated up as compared to regular fuel cell systems with a reformer for reforming hydrocarbons or alcohol or the like. The system exhibits virtual freeze compatibility since waste heat to prevent freezing is available at all times. The components used are more or less state of the art components and the power supply shows virtually no limit of cycle numbers.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A power supply for a vehicle, comprising:
   an electric generator driven by a combustion engine of said vehicle;
   a fuel cell having a hydrogen input, an oxygen input and an exhaust output;
   an electrolyzer coupled to receive electricity generated by said electric generator when said combustion engine is running, to generate hydrogen and oxygen by electrolysis of water powered by said electricity received from said electric generator;
   a hydrogen storage device connected to the electrolyzer for storing hydrogen produced by the electrolyzer, and connected to supply hydrogen to the fuel cell; and
   a water supply for supplying water to the electrolyzer.

2. A power supply according to claim 1, wherein the auxiliary power unit further comprises one of a dc/dc-converter, an ac/dc-converter and an electric control for supplying electric energy to one of electric loads and an electric storage means of the vehicle when the engine is inoperative.

3. A power supply according to claim 1, wherein the electrolyzer comprises a reversible fuel cell, which is operable in both an electrolyzer mode and a fuel cell mode.

4. A power supply according to claim 1, wherein the water supply comprises a condenser for separating water from a fuel cell exhaust.

5. A power supply according to claim 1, wherein the water supply comprises one of a water buffer tank and a vehicle water tank for separating water from a fuel cell exhaust.

6. A power supply according to claim 1, wherein the electrolyzer is a high pressure electrolyzer operated at a pressure above 100 bar.

7. A power supply according to claim 1, wherein the hydrogen storage tank is a high pressure storage device operated at a pressure of approximately 400 bar.

8. A power supply according to claim 5, further comprising a purification device disposed between the water buffer tank and the electrolyzer.

9. A power supply according to claim 1, wherein the electrolyzer further comprises an oxygen storage tank.

10. A power supply according to claim 1, further comprising a compressor arranged between said electrolyzer and said hydrogen storage.

11. A method for operating a power supply for an auxiliary power unit of a vehicle having a combustion engine that drives an electric generator, which power supply has a fuel cell; an electrolyzer coupled to receive electric power from said electric generator, for generating hydrogen and oxygen from water; a hydrogen storage device connected to the electrolyzer for storing hydrogen produced by the electrolyzer, and connected to supply hydrogen to the fuel cell; and a water supply for supplying water to the electrolyzer; said method comprising:
   said electrolyzer using electricity generated by said electric generator to produce hydrogen while the vehicle's engine is operative;
   storing produced hydrogen in a pressurized storage container; and feeding said hydrogen to said fuel cell for producing electric power while the engine is inoperative.

12. A method according to claim 11, wherein the hydrogen is stored in a hydrogen storage tank at a pressure of approximately 400 bar.

13. A method according to claim 11, wherein water is fed to the electrolyzer by one of collecting water from the fuel cell exhaust and by collecting water from the combustion engine's exhaust.

14. A vehicle comprising:

an electric generator;

a combustion engine which drives said electric generator; and an auxiliary power unit which includes an electrolyzer coupled to receive electricity generated by said electric generator when said combustion engine is running, for using said electricity from said electric generator to generate hydrogen and oxygen from water;

a water supply for supplying water to the electrolyzer means;

a hydrogen storage device connected to the electrolyzer for storing hydrogen produced by the electrolyzer, and connected to supply hydrogen to the fuel cell; and fuel cell means for supplying electric power to load elements of said vehicle using stored hydrogen produced by said electrolyzer during operation of said combustion engine.

15. A method for operating an electric system of a vehicle having an electric generator that is driven by a combustion engine of said vehicle, which generator supplies electric power during operation of said combustion engine, said method comprising:

during operation of said combustion engine, using electric power from said electric generator to electrolyze water to produce hydrogen and oxygen;

storing at least said hydrogen that is produced by said electrolyzing of water during operation of said combustion engine;

during periods when said combustion engine is not in operation, supplying electric power to said electric system by feeding said stored hydrogen to a fuel cell to generate said electric power.

* * * * *